(12) United States Patent
Schadler et al.

(10) Patent No.: US 8,801,203 B2
(45) Date of Patent: Aug. 12, 2014

(54) DRIVE FOR A COMPONENT TO BE ADJUSTED

(75) Inventors: Bernhard Schadler, Sinabelkirchen (AT); Hermann Dornhofer, Birkfeld (AT)

(73) Assignee: Magna Auteca AG (AT)

( * ) Notice: Subject to any disclaimer, the term of this patent is extended or adjusted under 35 U.S.C. 154(b) by 173 days.

(21) Appl. No.: 13/144,420

(22) PCT Filed: Jan. 13, 2010

(86) PCT No.: PCT/EP2010/000238
§ 371 (c)(1),
(2), (4) Date: Sep. 22, 2011

(87) PCT Pub. No.: WO2010/081732
PCT Pub. Date: Jul. 22, 2010

(65) Prior Publication Data
US 2012/0008223 A1 Jan. 12, 2012

(30) Foreign Application Priority Data

Jan. 14, 2009 (EP) .................................... 09075020

(51) Int. Cl.
| | | |
|---|---|---|
| *G02B 7/182* | (2006.01) | |
| *G02B 7/198* | (2006.01) | |
| *B60R 1/062* | (2006.01) | |
| *B60R 1/072* | (2006.01) | |

(52) U.S. Cl.
CPC ............. *G02B 7/198* (2013.01); *B60R 1/062* (2013.01); *B60R 1/072* (2013.01)
USPC ...................................................... 359/872

(58) Field of Classification Search
USPC ................................. 359/872, 877
See application file for complete search history.

(56) References Cited

U.S. PATENT DOCUMENTS

| | | | | |
|---|---|---|---|---|
| 4,915,493 A | * | 4/1990 | Fisher et al. ................... | 359/874 |
| 4,981,279 A | * | 1/1991 | Andreas et al. ............... | 248/483 |

(Continued)

FOREIGN PATENT DOCUMENTS

| | | |
|---|---|---|
| DE | 202005018289 U1 | 1/2006 |
| EP | 1495912 A2 | 1/2005 |

(Continued)

OTHER PUBLICATIONS

"International Application No. PCT/EP2010/000238, International Preliminary Report on Patentability issued July 19, 2011", 14 pgs.

(Continued)

*Primary Examiner* — Ricky D Shafer
(74) *Attorney, Agent, or Firm* — Schwegman, Lundberg & Woessner, P.A.

(57) ABSTRACT

A drive for a component to be adjusted, in particular for an adjustable automotive vehicle mirror, having a housing which can be mounted on a stationary structure for receiving drive elements, and having an element which encompasses the housing at least partially and is connected to a carrier for the component. The encompassing element with the carrier is disposed pivotably relative to the housing and means for elastic pretension between housing and encompassing element are provided. The means for elastic pretension have a compensating element which is disposed about a central axis of the housing. The compensating element is moveable axially under the effect of a spring force in order to exert a pressure on the carrier and hence on the element encompassing the housing.

14 Claims, 2 Drawing Sheets

(56) References Cited

U.S. PATENT DOCUMENTS

Figure 1:
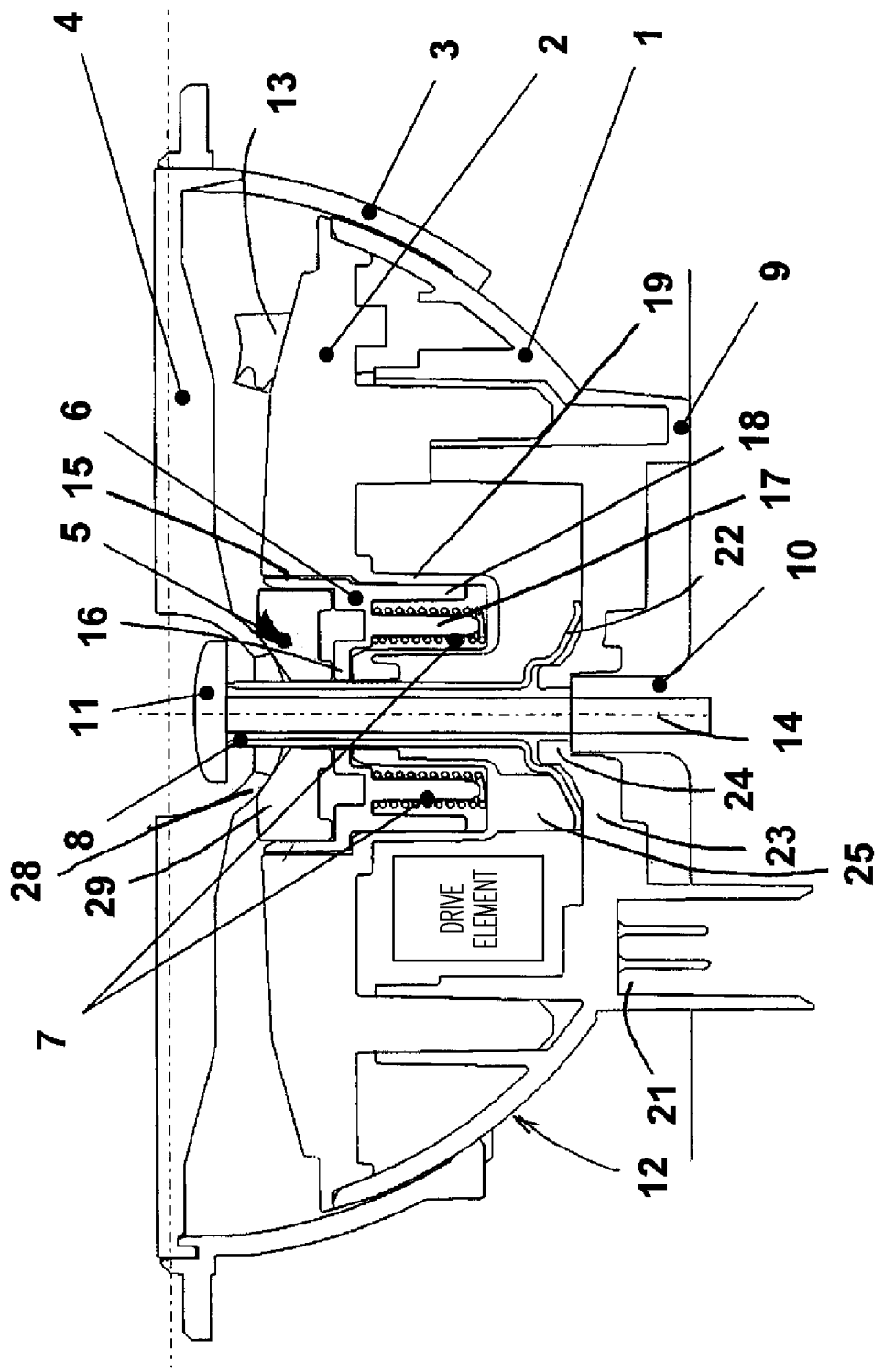

| | | | |
|---|---|---|---|
| 5,363,246 A * | 11/1994 | Perry et al. | 359/874 |
| 5,621,577 A * | 4/1997 | Lang et al. | 359/872 |
| 5,629,810 A * | 5/1997 | Perry et al. | 359/872 |
| 5,969,891 A * | 10/1999 | Otenio et al. | 359/871 |
| 6,174,062 B1 * | 1/2001 | Schillegger et al. | 359/872 |
| 6,899,439 B2 * | 5/2005 | Mendoza Vicioso | 359/877 |
| 7,703,933 B2 * | 4/2010 | Fukai et al. | 359/877 |
| 8,016,437 B2 * | 9/2011 | Wakabayashi | 359/871 |
| 2005/0030655 A1 * | 2/2005 | Tsuyama | 359/878 |
| 2008/0043354 A1 * | 2/2008 | Fukai et al. | 359/877 |
| 2008/0310040 A1 * | 12/2008 | Suzuki et al. | 359/873 |

FOREIGN PATENT DOCUMENTS

| | | |
|---|---|---|
| EP | 1808334 A1 | 7/2007 |
| WO | WO-98/31565 A1 | 7/1998 |

OTHER PUBLICATIONS

"International Application No. PCT/EP2010/000238, International Search Report and Written Opinion mailed Mar. 16, 2010", 12 pgs.

* cited by examiner

DRIVE FOR A COMPONENT TO BE ADJUSTED

PRIORITY CLAIM TO RELATED APPLICATIONS

This application is a national stage application under 35 U.S.C. §371 of PCT/EP2010/000238, filed Jan. 13, 2010, and published as WO 2010/081732 A1 on Jul. 22, 2010, which claims priority to European Application No. 09075020.9, filed Jan. 14, 2009, which applications and publication are incorporated herein by reference and made a part hereof in their entirety, and the benefit of priority of each of which is claimed herein.

The invention relates to a device for a component to be adjusted, in particular for an adjustable automotive vehicle mirror according to the preamble of the main claim.

A large number of drives for a component to be adjusted, in particular for the automotive vehicle sphere, is known, the components to be adjusted being mirrors, flaps for ventilation units and heating units or the like. A drive device for an adjustable rearview mirror is known for example from WO 98/31565. A drive housing in shell form which is fixed to the vehicle is thereby provided, which drive housing receives motors and transmission elements, such as gear wheels or screws. The housing forms a spherical guide face, with its outer face, for an element which encompasses the housing at least partially and is connected to a mirror carrier which is pivotable about two imaginary axes for adjustment of the rearview mirror and on which a mirror glass is mounted. In the element encompassing the housing at least partially at least one gearing, preferably two gearings, is provided, gear wheels driven by electromotors via transmission elements penetrating through the housing and, for adjustment of the encompassing element connected to the mirror carrier, engaging with the gearings thereof.

Normally, the material for the housings of the known drives is plastic material, i.e. in the case of the known described drive, both the housing which has a shell-shaped outer face and the element encompassing this outer face consist of plastic material. It is however known that plastic material yields with time and, at warm temperatures, inclines towards creep behaviour, consequently the clearance between the plastic material parts to be moved changes, which leads to vibrations on the mirror glass and to imprecisions in the adjustment.

A mirror adjusting device is known from DE 20 2005 018 289, which has a base part with a mirror carrier which is mounted pivotably relative to the base part. The base part has plastic material elements moulded on its circumference, which elements cooperate as contact part with a plastic material contact strip of the mirror carrier by exerting a spring force. In addition, one or more auxiliary springs are provided, the auxiliary spring being configured, in one embodiment, as a wire part with hook-shaped ends which surrounds the circumference of the base part. The auxiliary spring hence exerts a spring force which is directed radially outwards on the plastic material contact parts. Around the circumference of the base part, a plurality of wire parts or auxiliary springs is disposed. In another embodiment, the auxiliary spring is configured as a leaf spring in the form of a strip made of spring steel, essentially V-shaped, and disposed respectively between the contact parts and a circumferential wall of the base part. Such a known arrangement is constructionally complex since a plurality of auxiliary springs which must be fitted on the base part is provided. Furthermore, the spring force of the individual springs can vary so that no uniform friction moment is exerted over the circumference of the base part towards the contact strip of the mirror carrier.

Starting from the known state of the art, the object underlying the invention is to produce a drive for a component to be adjusted on a stationary structure, in particular for an adjustable automotive vehicle mirror, which ensures a constant friction moment over the entire lifespan of the drive between the housing which receives the drive elements and the element which encompasses the housing at least partially, means provided for this purpose being intended to be constructionally simple and easy to install.

This object is achieved according to the invention by the characteristic features of the main claim in conjunction with the features of the preamble.

By means of the measures indicated in the sub-claims, advantageous developments and improvements are possible.

As a result of the fact that means are provided for elastic pretension between the housing and the encompassing element and have a compensating element disposed about a central axis of the housing, the compensating element being moveable axially under the effect of a spring force in order to exert a pressure on the carrier and hence on the element encompassing the housing, a constant friction moment can be made available over the lifespan of the drive since the clearance occurring as a result of possible relaxation of the plastic material is compensated for by displacement of the compensating element and hence by axial displacement of the carrier together with the encompassing element. Since the spring force acts axially, a defined and uniform friction between the housing and the covering element is produced.

In a preferred embodiment, the housing consists of a shell-shaped lower housing, the outer face of which represents the contact face to the annular, encompassing element which forms a partial shell, and a cover-like upper housing, the compensating element being received in a central recess of the upper housing. As a result, a simple construction is made available.

In order to exert the spring force, at least one spring which acts axially relative to the central axis of the housing is advantageously disposed between the compensating element and the housing, preferably two springs are provided which are configured in turn preferably as spiral springs. However, also merely one spiral spring can be provided about the central axis. By means of such an arrangement, the axial force which presses the encompassing element with the mirror carrier upwards, viewed in the drawing, can be produced in a simple manner.

In order to centre the compensating element relative to the housing, means for centring are provided, which are configured for example as a pin-like sleeve, which is disposed centrally in the housing, for receiving a mounting element. In this way, the compensating plate which has a central opening can be orientated accurately relative to the central axis.

In a preferred embodiment, the springs, preferably the spiral springs, are disposed symmetrically to the central axis and pins for centring the springs are likewise preferably moulded on the compensating element. As a result of these means, the forces are directed uniformly towards the compensating plate, on the one hand, and the springs are guided axially accurately so that no tilting between the housing and the encompassing element occurs and the defined friction between the mentioned parts is ensured.

The compensating element can have a plate-shaped configuration, with the moulded-on pins for centring the springs, the plate-shaped element preferably being curved or having two prism-like faces. This embodiment is particularly advantageous since the compensating element is a component of a rotary bearing arrangement for the carrier.

For this purpose, the carrier configured as a plate has a moulded-on partial cylinder in the centre, an anti-rotation element being disposed between the partial cylinder of the carrier and the compensating element, the bearing face orientated towards the partial cylinder of which comprises, for the same, two prism-like faces and the face orientated towards the compensating element of which is configured as a partial cylindrical sliding face. In this way, a double cylinder V-guide is formed, in the case of which the respective partial cylindrical faces of the carrier plate and of the anti-rotation element have a linear support on the prismatic faces. As a result, a tolerance compensation in the anti-rotation mounting is produced and it becomes possible to compensate for centring errors caused during manufacture. As a result, a uniform contact between the outer face of the housing and the inner face of the encompassing element results.

In a preferred embodiment, the pin-like sleeve which is disposed centrally in the housing and penetrates through parts of the mounting with a double cylinder V-guide has a plate-like projection which is supported against the housing. By means of this plate spring-like projection, the pretension force resulting after screwing the drive together with the stationary structure is distributed to the inside or the base of the housing and hence to the support points. As a result, a secure uniform supporting of the drive over the lifespan is achieved.

One embodiment of the invention is represented in the drawing and is explained in more detail in the subsequent description. There are shown FIG. 1 a section through the drive according to the invention and FIG. 2 a schematic representation of the rotary mounting used in the embodiment according to the invention, having anti-rotation means and a double cylinder V-guide.

Figure 2:
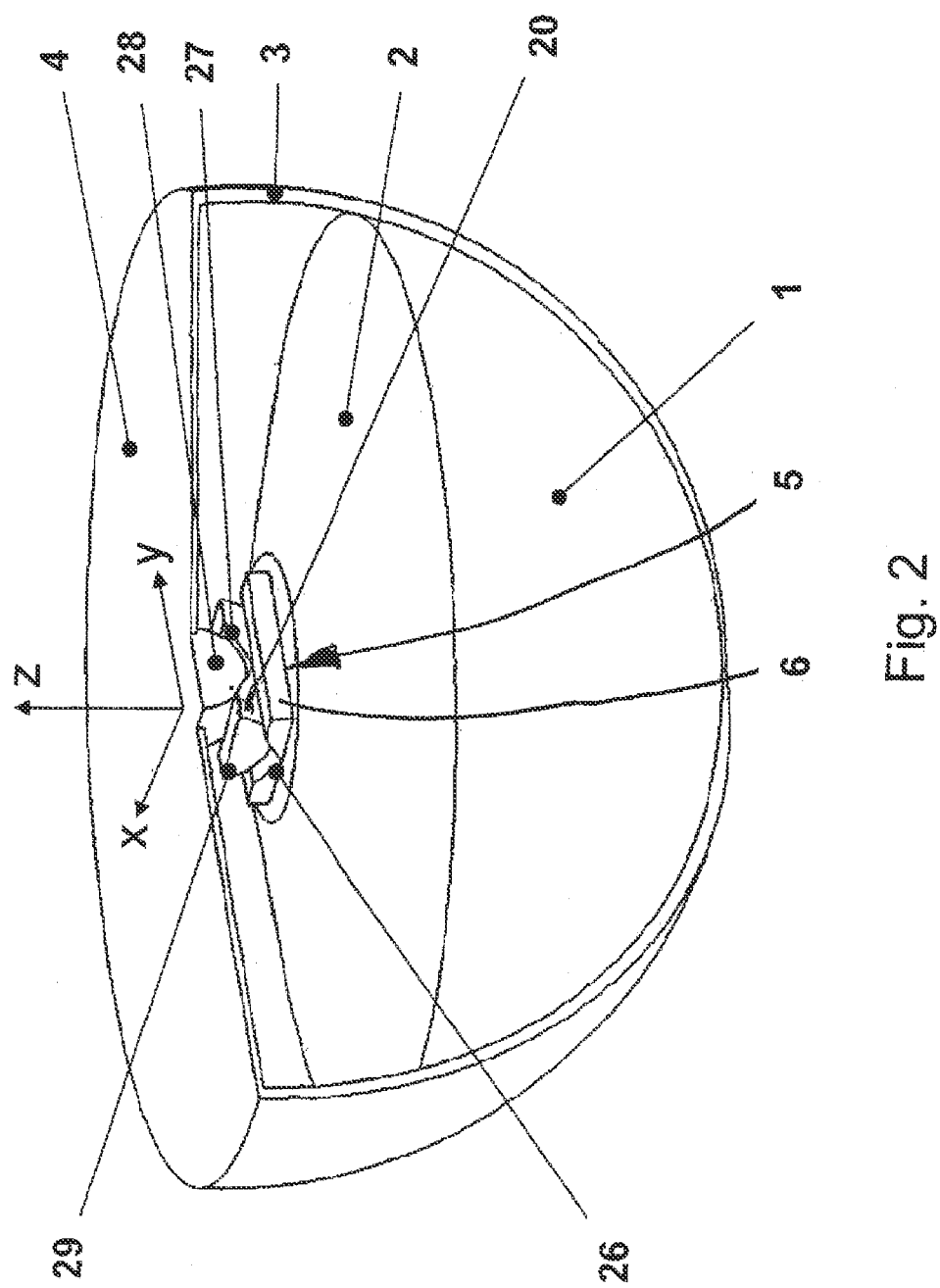

The drive represented in FIG. 1, corresponding to the invention, has a shell-shaped lower housing 1 and an upper housing which is connected to the lower housing 1, for example via snap-in locking and/or clip connections, said upper housing sealing the lower housing in the manner of a cover. In the thus formed housing 12, drive elements are accommodated, such as e.g. electromotors, transmission screws and gear wheels.

The shell-shaped housing 12 comprising lower housing 1 and upper housing 2 is covered by an annular drive shell 3 which is connected to a carrier plate 4, the connections being able again to be snap-in locking and clip connections. There is understood by annular drive shell that the lower housing 1 is covered only in regions, as can be detected readily in FIG. 1. The inner face of the drive shell 3 slides on the outer face of the shell-shaped lower housing 1, as a result of which the carrier plate 4 is pivoted. On the carrier- or adapter plate 4, a mirror element of a rearview mirror for automotive vehicles is mounted, in the preferred embodiment. On the inside of the drive shell 3, a gearing 13 is indicated in the illustrated embodiment, which gearing is engaged with a drive gear wheel, not illustrated, which penetrates through the lower housing and is driven via transmission elements by an electromotor (not illustrated). A further gearing is disposed approx. 90° relative to the illustrated gearing 13 and is in communication with a further drive gear wheel, not illustrated. As a result, the carrier plate 4 can be pivoted in all directions.

In the upper housing 2, a recess 15 is provided about a central axis 14 of the drive, into which a compensating element 6 is inserted. The compensating element 6 comprises a plate-shaped part 16 on which two pins 17, which protrude into the recess 15, and two guides 18 are moulded. The plate-shaped upper part 16 and also the recess 15 have a square outline. The recess 15 continues into the moulded-on hollow projections 19 which serve for receiving the pins 17 and the guides 18. Between the base of these hollow projections 19 and the plate-shaped upper part 16 of the compensating element 6, spiral springs 7 under pretension are inserted around the pins 17. These springs 7 hence press the compensating element 6 upwards in FIG. 1.

The axis of rotation of the drive, for example of a mirror adjustment drive, is determined by the spherical face on the drive shell 3 and by the spherical face on the lower housing. The drive shell 3 with carrier plate 4 thereby pivots about a mounting 5 with anti-rotation means which is explained in more detail with the help of FIG. 2. In this FIG. 2, the lower housing 1 and the upper housing 2 and also the drive shell 3 with the carrier plate 4 are illustrated schematically and serve in this form for explaining the mounting 5. A coordinate system is designated, in the known manner, with x, y and z, The compensating element 6, a part of the upper part of which can be seen here schematically, has a V-guide 26 comprising two diagonal faces on which an anti-rotation element or intermediate element 20 is situated. This intermediate element 20 is provided with a partial cylinder face 29 on the side orientated towards the compensating element 6, which partial cylinder face can be configured, as represented in FIG. 1, also in individual runners. A partial cylinder 28 is likewise moulded on the carrier plate 4, as can be detected in section also in FIG. 1. This partial cylinder is received by the intermediate element 20 which has a V-guide 27 consisting of two diagonals, on the side orientated towards the partial cylinder 28. Because of this arrangement of the mounting, in the case of centring errors caused by the manufacturer, i.e. in the case of non-centricity, the intermediate bearing element 20 can undertake a linear movement in the y-direction and the cylinder 28 in the V-guide 27 can perform a linear movement in the x-direction. In this way, tolerance compensation takes place. Due to the double cylinder V-guide 26, 27, 28, 29, respectively a linear contact between the diagonal faces of the V-guides 26 and 27 and the assigned partial cylinders 28 and 29 takes place during pivoting of the drive shell 3 and the carrier plate 4 about the x axis and the y axis.

As can be detected in FIG. 1, the drive is mounted on a stationary structure 10, for example a part of a mirror carrier part connected to the automotive vehicle, a socket 21 of the drive being connected to a corresponding plug of an electrical line. Normally, the drive is screwed together with the stationary structure 10 by means of a mounting screw 11 such that the lower housing 1 is supported on the stationary structure 10 by support points 9. In order to achieve a secure support of the drive over the entire lifespan, a sleeve 8, as can be detected in FIG. 1, is received in the housing 12 about the central axis 14. At one end, the sleeve 8 has a plate spring-like projection 22 which is supported on the base 23 of the lower housing 1, this base 23 having an inwardly drawn raised portion 24 which engages in the plate spring-like projection 22 and is disposed about an opening in the base 23 for penetration of the mounting screw 11. An extension 25 of the hollow projection 19 thereby presses from the top (corresponding to FIG. 1) on the plate 22. The sleeve 8 penetrates through the parts of the mounting 5 and protrudes into a recess of the carrier plate 4 which is configured to allow pivoting of the carrier plate 4 together with the drive shell 3. In order to screw the mounting screw 11 into the stationary structure 10, the screw 11 is guided through the sleeve 8 and, during tightening, the plate-shaped projection is pressed against the base 23 and the raised portion 24 so that essentially the air between these parts is eliminated and the base is retained under tension. As a result, the pretension force is distributed to the support points 9 so that the screw cannot become loose even over the lifespan and the drive sits securely on the stationary structure.

If the plastic material is subject to relaxation in the course of the lifespan of the drive by means of which clearance could occur between the lower housing 1, i.e. between its outer spherical face, and the drive shell 3, i.e. its inner spherical face, the spiral springs 7 press the compensating element 6 upwards in FIG. 1, as a result of which also the parts of the mounting 5 and hence the carrier plate 4 together with the drive shell are pressed upwards so that the drive shell 3 abuts still against the lower housing 1 and a defined friction between the lower housing 1 and the drive shell 3 is produced. Due to the axial spring force of the spiral springs 7 and the compensating element 6, the drive shell 3 is hence retained against the lower housing 1 without clearance uniformly over the entire circumference.

What is claimed is:

1. A drive for an adjustable automotive vehicle mirror, comprising:
    a housing mounted on a stationary structure for receiving drive elements, and
    an encompassing element which encompasses the housing at least partially and is connected to a carrier, the encompassing element with the carrier being disposed pivotably relative to the housing and means for elastic pretension between the housing and the encompassing element being provided,
    wherein the encompassing element is in frictional contact with the outside surface of the housing containing the drive elements and the means for elastic pretension include a compensating element disposed about a central axis of the housing, the compensating element being moveable axially under the effect of a spring force in order to exert a pressure on the carrier and hence on the element encompassing the housing.

2. The drive according to claim 1, wherein the housing comprises a shell-shaped lower housing and a cover-like upper housing, the compensating element being received in a central recess of the upper housing.

3. The drive according to claim 1, wherein the means for elastic pretension includes at least one spring which acts axially relative to the central axis of the housing is disposed between the compensating element and the housing.

4. The drive according to claim 1, further comprising means for centering the compensating element relative to the housing.

5. The drive according to claim 1, wherein, in the housing, a pin-like sleeve for receiving a mounting screw is disposed about the central axis.

6. The drive according to claim 5, wherein the compensating element has an opening for penetration of the pin-like sleeve.

7. The drive according to claim 1, wherein the compensating element has a plate-like configuration.

8. The drive according to claim 1, wherein the compensating element has a guide comprising two prism-like faces or a curved face.

9. The drive according to claim 8, wherein the carrier is configured as a carrier plate for mounting a mirror and a partial cylinder is moulded centrally on the carrier plate.

10. A drive for an adjustable automotive vehicle mirror, comprising:
    a housing mounted on a stationary structure for receiving drive elements, and
    an encompassing element which encompasses the housing at least partially and is connected to a carrier for a component, the encompassing element with the carrier being disposed pivotably relative to the housing and means for elastic pretension between the housing and the encompassing element being provided,
    wherein the means for elastic pretension include a compensating element disposed about a central axis of the housing, the compensating element being moveable axially under the effect of a spring force in order to exert a pressure on the carrier and hence on the element encompassing the housing;
    wherein the means for elastic pretension includes at least two springs which act axially relative to the central axis of the housing and are disposed between the compensating element and the housing, wherein the at least two springs are provided symmetrically to the central axis, and pins for centering the springs being disposed on the compensating element.

11. A drive for an adjustable automotive vehicle mirror, comprising:
    a housing mounted on a stationary structure for receiving drive elements, and
    an encompassing element which encompasses the housing at least partially and is connected to a carrier for a component, the encompassing element with the carrier being disposed pivotably relative to the housing and means for elastic pretension between the housing and the encompassing element being provided,
    the means for elastic pretension include a compensating element disposed about a central axis of the housing, the compensating element being moveable axially under the effect of a spring force in order to exert a pressure on the carrier and hence on the element encompassing the housing;
    wherein the compensating element has a guide comprising two prism-like faces or a curved face;
    wherein the carrier is configured as a carrier plate for mounting a mirror and a partial cylinder is moulded centrally on the carrier plate;
    wherein an anti-rotation element is disposed between the partial cylinder of the carrier plate and the compensating element, said anti-rotation element has a guide orientated towards the partial cylinder and comprises prism-like faces or curved bearing faces, and a partial cylindrical sliding face orientated towards the compensating element.

12. The drive according to claim 11, wherein the compensating element, the anti-rotation element and the partial cylinder of the carrier plate form a rotary bearing for the carrier plate and the encompassing element with the guide.

13. A drive for an adjustable automotive vehicle mirror, comprising:
    a housing mounted on a stationary structure for receiving drive elements, and
    an encompassing element which encompasses the housing at least partially and is connected to a carrier for a component, the encompassing element with the carrier being disposed pivotably relative to the housing and means for elastic pretension between the housing and the encompassing element being provided,
    the means for elastic pretension include a compensating element disposed about a central axis of the housing, the compensating element being moveable axially under the effect of a spring force in order to exert a pressure on the carrier and hence on the element encompassing the housing;

wherein, in the housing, a pin-like sleeve for receiving a mounting screw is disposed about the central axis;

wherein the pin-like sleeve has a plate spring-like projection which is supported against the housing.

14. The drive according to claim 13, wherein the housing comprises a shell-shaped lower housing and a cover-like upper housing, the compensating element being received in a central recess of the upper housing, and wherein the plate spring-like projection is supported on a base of the lower housing and at least one projection moulded on the upper housing forms a limit stop for holding down the plate-like projection.

\* \* \* \* \*